(12) United States Patent
Köhler et al.

(10) Patent No.: US 10,238,026 B2
(45) Date of Patent: Mar. 26, 2019

(54) SYSTEM FOR MONITORING AND CONTROLLING ACTIVITIES OF AT LEAST ONE GARDENING TOOL WITHIN AT LEAST ONE ACTIVITY ZONE

(71) Applicant: HUSQVARNA AB, Huskvarna (SE)

(72) Inventors: Moritz Köhler, Zürich (CH); Philipp Bollinger, Winterthur (CH); Lukas Bachmann, Zürich (CH)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/140,803

(22) Filed: Sep. 25, 2018

(65) Prior Publication Data
US 2019/0021224 A1    Jan. 24, 2019

Related U.S. Application Data

(63) Continuation of application No. 14/905,315, filed as application No. PCT/EP2014/065165 on Jul. 15, 2014, now Pat. No. 10,104,835.

(30) Foreign Application Priority Data

Jul. 15, 2013    (DE) .................. 10 2013 107 492

(51) Int. Cl.
*A01D 34/08*    (2006.01)
*A01D 34/00*    (2006.01)
*G05B 15/02*    (2006.01)

(52) U.S. Cl.
CPC .......... *A01D 34/008* (2013.01); *G05B 15/02* (2013.01)

(58) Field of Classification Search
CPC ............................. A01D 34/008; G05B 15/02
USPC .................................................. 700/275
See application file for complete search history.

(56) References Cited

U.S. PATENT DOCUMENTS

| | | |
|---|---|---|
| 4,986,384 A | 1/1991 | Okamoto et al. |
| 5,323,593 A | 6/1994 | Cline et al. |
| 6,587,772 B2 | 7/2003 | Behnke |
| 7,076,348 B2 | 7/2006 | Bucher et al. |
| 7,729,834 B2 | 6/2010 | Meyer Zu Helligen et al. |
| 7,756,624 B2 | 7/2010 | Diekhans et al. |
| 8,996,171 B2 | 3/2015 | Anderson et al. |

(Continued)

FOREIGN PATENT DOCUMENTS

| | | |
|---|---|---|
| CN | 102771246 A | 11/2012 |
| CN | 102960113 A | 3/2013 |

(Continued)

OTHER PUBLICATIONS

Peiling, Y. et al., "Innovation and development of urban agricultural engineering technology II," China Water Power Press, see the formal text, published on Sep. 30, 2005, pp. 1-11.

(Continued)

*Primary Examiner* — Harry W Byrne
(74) *Attorney, Agent, or Firm* — Burr Forman McNair

(57) ABSTRACT

The invention relates to a system for monitoring and controlling activities of at least one gardening tool (12) within at least one activity zone (14). According to the invention, a monitoring device (16) is provided for analyzing at least one activity zone state of the activity zone (14) and at least one gardening tool state of the gardening tool (12) to control the gardening tool (12).

17 Claims, 5 Drawing Sheets

(56) References Cited

U.S. PATENT DOCUMENTS

Figure 1:
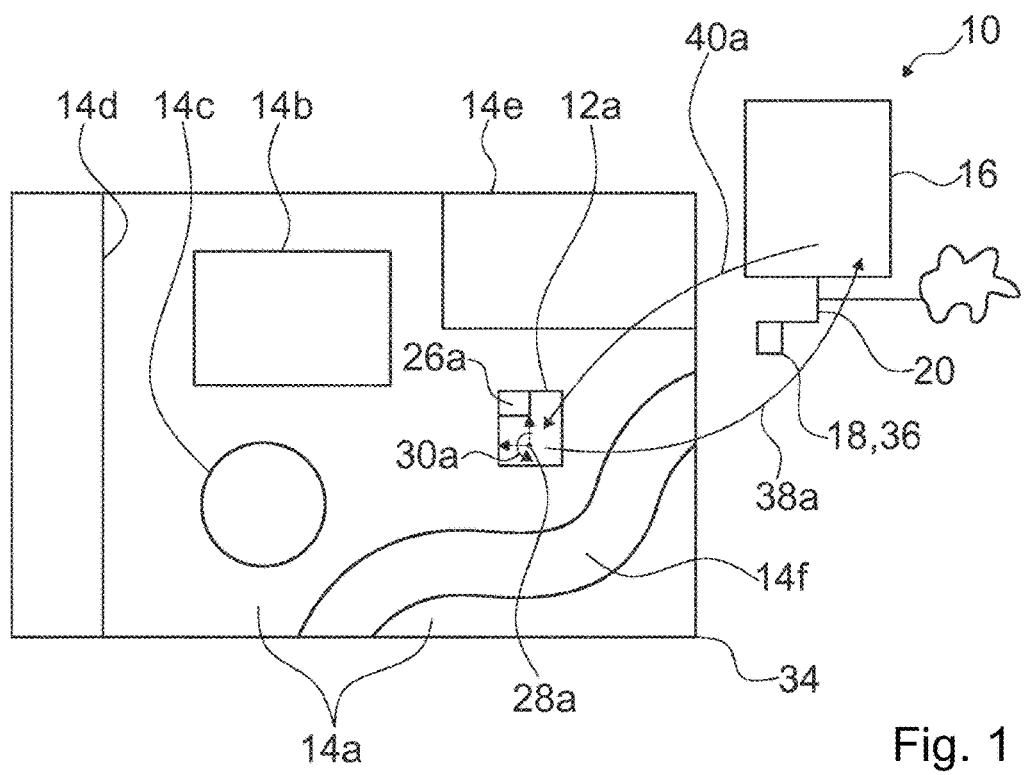

| | | |
|---|---|---|
| 2003/0236723 A1 | 12/2003 | Angott |
| 2008/0189166 A1* | 8/2008 | Brooks .................. G06Q 10/00 705/315 |
| 2010/0299016 A1 | 11/2010 | Benzler et al. |
| 2010/0324731 A1 | 12/2010 | Letsky |
| 2011/0295424 A1 | 12/2011 | Johnson et al. |
| 2012/0290165 A1 | 11/2012 | Ouyang |
| 2014/0257620 A1 | 9/2014 | Biber |

FOREIGN PATENT DOCUMENTS

| | | |
|---|---|---|
| DE | 197 05 842 A1 | 8/1998 |
| DE | 101 28 083 A1 | 12/2002 |
| DE | 10 2007 053 311 A1 | 12/2008 |
| DE | 10 2007 059 118 A1 | 6/2009 |
| DE | 20 2012 006 267 U1 | 10/2012 |
| DE | 10 2011 084 793 A1 | 4/2013 |
| EP | 2 502 481 A1 | 9/2012 |
| JP | H02-110606 A | 4/1990 |
| JP | H10-338314 A | 12/1998 |
| JP | 2000-14208 A | 1/2000 |
| JP | 2004-306622 A | 11/2004 |
| JP | 2007-168533 A1 | 7/2007 |
| JP | 2010-072750 A | 4/2010 |
| JP | 2011-142900 A | 7/2011 |
| JP | 2011-172565 A | 9/2011 |
| JP | 5158537 B2 | 3/2013 |
| RU | 2 282 972 C2 | 9/2006 |
| RU | 2 412 580 C2 | 2/2011 |
| RU | 2 423 038 C2 | 7/2011 |
| WO | 2011/115563 A1 | 9/2011 |
| WO | 2012/044220 A1 | 4/2012 |

OTHER PUBLICATIONS

International Search Report and Written Opinion for International Application No. PCT/EP2014/065165, dated Oct. 23, 2014.

International Preliminary Report on Patentability for International Application No. PCT/EP20141065165 dated Jan. 19, 2016.

* cited by examiner

SYSTEM FOR MONITORING AND CONTROLLING ACTIVITIES OF AT LEAST ONE GARDENING TOOL WITHIN AT LEAST ONE ACTIVITY ZONE

CROSS REFERENCE TO RELATED APPLICATIONS

This application is a continuation of U.S. application Ser. No. 14/905,315 filed Jan. 15, 2016, which is a national phase entry of PCT/EP2014/065165 filed Jul. 15, 2014, which claims priority to German application number 102013107492.8 filed Jul. 15, 2013, the entire contents of each of which is hereby incorporated by reference in their entirety.

STATE OF THE ART

The invention relates to a system for monitoring and controlling activities of at least one gardening tool within at least one activity zone.

The gardening tool disclosed in WO 2011/115563 has a processor unit, which compares coordinates of activity zones stored on the gardening tool with positional data of a locating means of the gardening tool, in order to determine in which activity zone the gardening tool is located. Depending on the activity zone, the gardening tool performs different functions, such as grass cutting with different cutting heights.

The gardening tool disclosed in US 2003/236723 A1 transmits activities to an external billing system, which issues billing statements based on the activities of the gardening tool.

The gardening tool disclosed in US 20103/24731 A1 determines a map of an activity zone by tracking its path by remote control by a user with a locating means and, as soon as a closed path is detected, this is assumed as a boundary of an activity zone.

These gardening tools control their activities within an activity zone independently, without taking into account the state of other activity zones and/or other gardening tools and/or the environment. This may lead to a lack of efficiency in the use of the gardening tool and/or undesired results and/or conflicts between gardening tools and/or between gardening tools and a user.

The object of the invention is, in particular, to provide a system for monitoring and controlling activities of at least one gardening tool with improved properties with respect to the controlling of activities of gardening tools. The object is achieved according to the invention by the features of claim 1, while advantageous embodiments and developments of the invention can be gathered from the dependent claims.

ADVANTAGES OF THE INVENTION

The invention is based on a system for monitoring and controlling activities of at least one gardening tool within at least one activity zone.

A monitoring device is proposed which is provided to evaluate at least one activity zone state of the activity zone and at least one gardening tool state of the gardening tool for controlling the gardening tool. In this context, a "gardening tool" is in particular to be understood as a preferably at least partially autonomous tool, which is provided for use in a garden. The garden may serve for the growing and cultivation of plants and/or recreational activities and/or the relaxation of users of the garden. In this context, "users" are in particular to be understood as persons present in the zone of the garden. Further, animals, especially pets, who are in the garden may also be users of the garden. The garden may be a public garden or park. The garden is preferably a private garden. The garden may surround a building, such as a public building, a hotel and/or a hospital. The garden preferably surrounds a residential building. The garden may also be part of a building, such as, in particular, a roof garden or terrace. The garden may have planting boxes and/or pots with plantings.

The garden may be established on its own, demarcated piece of land, such as an allotment garden. In this context, a garden is also to be understood as a garden-like zone, such as, in particular, a golf course or other garden-like usable surface. The gardening tool may be designed, inter alia, as a lawn mower, in particular a robotic mower, cutting tool, in particular a robotic hedge trimmer, irrigation tool, fertilization tool and/or lighting apparatus. Furthermore, the gardening tool may be designed, inter alia, as a robotic leaf collector, mulcher, robotic water cleaner, pump or heater. Further tools which can be used in a garden for performing partially or preferably fully automated activities are also conceivable. In particular, devices which are provided for opening and/or closing doors and/or roofs of shelters and/or retracting and/or extending sun shades are to be understood as gardening tools in this context. In this context, an "activity zone" should be understood in particular as a zone in which a gardening tool is to perform an activity. Activity zones may be, inter alia, mowing zones, hedge cutting zones, fertilizing zones, lighting zones and/or irrigation zones. Further, an activity zone may also be a prohibited zone, which is to be avoided by gardening tools and/or in which gardening tools are not to perform activities, or a crossing area which can be crossed by gardening tools, but in which no further activities, such as cutting, irrigation, fertilizing, etc., are to be performed. While they execute an activity in an activity zone, gardening tools may remain in the activity zone. For example, a robotic mower which mows a lawn in an activity zone remains in the activity zone. It is also possible that gardening tools remain outside the activity zone by performing an activity and/or by performing activities in a plurality of activity zones from one activity zone. For example, an irrigation tool, such as a lawn sprinkler, may water a plurality of activity zones with irrigation streams from one location or one region in an activity zone, without the irrigation tool itself being located within these activity zones. The irrigation streams may be controlled such that the lawn sprinkler irrigates desired irrigation zones, while it excludes zones, such as in particular prohibited zones or crossing zones, from irrigation. The gardening tool may be designed as a gardening tool which is guided by an operator, such as a lawn mower guided by an operator or an irrigation apparatus guided by an operator, such as in particular an irrigation hose. In this context, an "operator" should be understood in particular as a user of the garden who directly operates or controls at least partial functions of a gardening tool. In this context, a "monitoring device" should be understood in particular as a device which is designed independent of a single gardening tool, which is provided for controlling and/or monitoring gardening tools. The monitoring device may be designed as a distributed system having a plurality of intercommunicating processor and storage units. In particular, a plurality of gardening tools and/or activity zones may have processor and storage units of the monitoring device. The monitoring device may be a part of a building automation system or have an interface with a building automation system. In this context, a "building automation system" should be understood in particular as a system which is provided to control and/or regulate functions of apparatuses of a building, such as in particular heating and air conditioning systems, lighting apparatuses, locking systems, windows and/or blinds, shutters and/or awnings, as well as further devices which perform activities within a building, such as in particular autonomous cleaning systems, for example vacuum cleaners. Activities within a building and a garden surrounding the building may advantageously be matched to one another. For example, blinds may be closed by the building automation system before irrigation systems are activated by the monitoring device. The monitoring device is preferably designed as a server. In this context, a "server" should be understood in particular as a computer system with a server software, which is provided for storing and processing data from clients. In particular, gardening tools, activity zones and users may be clients of the server. The server may be a part of the gardening tool. The server is preferably designed as a stationarily-arranged computer system. The server is particularly preferably a "cloud-based" server as a part of a computer center connected with the Internet. The monitoring device may advantageously evaluate and/or store the state of activity zones, such as grass height, soil moisture and/or nutrient content, the presence of persons and/or further gardening tools and the state of the gardening tools, and it may suitably control the at least one gardening tool. The monitoring device may control gardening tools guided by an operator. The gardening tool guided by the operator may have an output unit, in order to provide the operator with instructions for guiding the gardening tool, such as information regarding a speed and/or direction in which the gardening tool should be guided. The monitoring device may control the output of information to the operator through the gardening tool. The monitoring device may control the gardening tool state of the gardening tool guided by the operator suitably, for example, to adjust a cutting height or irrigation amount. In particular, the monitoring device may possess a variety of information. Conflicts with additional gardening tools and/or additional users which may arise with the separate controlling of a gardening tool may be avoided.

Particularly advantageously, the monitoring device is provided for simultaneously monitoring and controlling activities of gardening tools of different types. In particular, the monitoring device may be provided to control a sequence of activities of various gardening tools, such as robotic mowers, irrigation tools and fertilizing tools, such that the activities are advantageous and/or particularly effective. In particular, the monitoring device may be provided to avoid conflicts of the activities of gardening tools and to allow the gardening tools to perform their activities in an advantageous order. Preferably, a robotic mower can first mow a lawn, before an irrigation tool irrigates the lawn. A disadvantageous cutting of a damp lawn can be avoided. The monitoring device is preferably provided to prioritize the activities of gardening tools and/or users. In particular, the activities of users may take precedence over the activities of gardening tools. Gardening tools may avoid users and/or adjust activities that affect users. Cutting machines, such as robotic mowers or hedge cutting machines, may take precedence over irrigation tools. It may be ensured that cutting is always performed prior to irrigation.

For controlling the activities of the gardening tool within an activity zone, the monitoring device preferably evaluates a gardening tool state of at least one additional gardening tool and/or an activity zone state of at least one additional activity zone. During an activity of a gardening tool in an activity zone, the state of a further gardening tool and/or the state and/or activity of a further gardening tool may advantageously be taken into account. For example, the monitoring device may reset activities which cause noise emissions in an activity zone, such as lawn mowing, when a neighboring activity zone is used by a user for relaxation.

It is further advantageous if the monitoring device is provided for monitoring and controlling gardening tools in mutually overlapping activity zones. The activity zones may overlap wholly or partly. For example, a fertilization zone may be simultaneously wholly or partly an irrigation zone and a mowing zone. Further, gardening tools may be associated with activity zones. A plurality of mowing zones may each be assigned a mowing robot. The mowing zones may overlap one another. In the overlapping regions in this example, the robotic mowers of all mowing zones which overlap in this area may mow the lawn. The monitoring device may preferably control the gardening tools such that conflicts, in particular collisions, can be avoided. In particular, the monitoring device may instruct a gardening tool to refrain from an activity in an overlapping zone and/or activity zone if said activity has already been carried out by a further gardening tool. For example, one robotic mower may have already mowed an overlapping zone, so that further robotic mowers need not mow the overlapping zone again. A particularly efficient and/or conflict free controlling of the gardening tools may be possible.

It is further proposed that the monitoring device is provided to create activity zone map information of the activity zone by linking zone map information with user information and/or activity zone states and/or gardening tool states. In this context, a "zone map" should be understood in particular as a map of a zone which includes the activity zones. The zone map may comprise the boundaries and topography of a zone. The zone map may be generated in particular with the aid of maps from a map server, such as an Internet-based map service. Additionally or alternatively, 3D cameras, laser measuring tools or further tools deemed appropriate by a person of skill in the art may be used for the generation of zone maps. The monitoring device may preferably be provided to determine zone map information with the aid of an evaluation of the orientations and positions of the gardening tools. The gardening tools may move in a zone and identify and/or learn the zone boundaries. The gardening tools may preferably transmit the identified and/or learned zone boundaries to the monitoring device. An activity zone map may be created with the aid of the zone map. Further information may be used for the creation of the activity zone map, such as local survey data, information from the gardening tools and in particular with the aid of aerial photography, in particular with data obtained by unmanned photo and/or survey drones. User information may include in particular further descriptions of the activity zones, calendar information and/or user activity of one or more users. Furthermore, user information may contain observations of at least one user in activity zones, in particular shortcomings such as an insufficiently cut lawn, under- or over-irrigated zones, plants with signs of deficiency or pest infestation. Furthermore, user information may contain direct control commands for gardening tools, such as a direct command from the user to a gardening tool to start and/or stop an activity and/or remote control commands to the gardening tools. Activity zone states describe the state of an activity zone both historical, i.e. temporally past states of the activity zone, and current. Activity zone states may comprise vegetation type and length and the spatial arrangement thereof, fertilizer concentrations and fertilization needs, type of soil and soil density, environmental conditions determined by sensors in the activity zone, such as soil moisture, light and temperature conditions, or pH level, and in particular the last actions performed in the activity zone, for example when the activity zone was last irrigated and/or last fertilized. Gardening tool states may include current and historical activities, location and movement information such as current and historical positions and current and historical motion vectors, states of charge of battery units of the gardening tools and maintenance condition and maintenance history. Further, gardening tool states may include settings of the gardening tools such as speeds, cutting heights, flow rates and/or lighting intensity. Depending on the nature of the activity zone and/or the gardening tool, activity zone states and/or gardening tool states may comprise further information which appears useful to a person of skill in the art. The activity zone states and/or gardening tool states may form an advantageous basis for controlling and monitoring the gardening tools. Observations of the user in the activity zones may advantageously be used for controlling and monitoring the gardening tools. If desired, the user can directly influence the activities of the gardening tools. The maintenance state may advantageously be used to request maintenance of the gardening tools. The gardening tool state may advantageously be used for management of the gardening tools. Gardening tools may be serviced and/or replaced depending on the maintenance state. Gardening tool states may be evaluated and quality data may be collected. The gardening tools can be used particularly efficiently. A provider of gardening tools can efficiently plan the use of gardening tools in a plurality of gardens. The efficient management of a fleet of gardening tools of the provider can be simplified.

For controlling the activities of the at least one gardening tool, the monitoring device is particularly preferably provided to link at least one user information with at least one activity zone state and/or at least one environmental condition. An environmental condition may include soil moisture, light and temperature conditions, pH levels, hours of sunshine, quantity of rain, wind speed and/or an activity of persons in the environment of the garden. In particular, the environmental condition may include historical, current and future weather conditions, i.e. a forecast of weather conditions. Further, an environmental condition may include a rest period, in particular for persons in the environment of the garden. During this time, activities which cause emissions can be avoided. Wireless sensors may preferably be arranged in the garden and/or in activity zones, which wireless sensors are provided to measure one or more environmental conditions and transmit said environmental conditions to the monitoring device. The monitoring device may advantageously control the gardening tools predictively under consideration of an expected weather development. With respect to the weather development, it can be avoided that unnecessary and/or disadvantageous activities are performed. An irrigation may be omitted, for example, if rain is at least likely within a specified period of time. Water can be saved and/or over-watering avoided. Further, user information such as calendar information, a calendar interval and/or calendar entry may be linked. A calendar entry may include that the user will be present in the garden during a fixed time. The monitoring device can prevent that disruptive activities of gardening tools take place during this fixed time. The monitoring device may preferably be provided to create and/or modify calendar entries. The monitoring device can create a scheduled activity as a calendar entry. Users can check scheduled activities by means of such calendar entries.

It is further proposed that the monitoring device has a wireless communication means for communicating with the at least one gardening tool. In particular, the wireless communication means may have a wireless connection, in particular a WLAN, mobile/GPRS, DECT, Bluetooth and/or ISM/SRD-type AB-based wireless connection. The monitoring device may in particular communicate easily with the gardening tools. A wired infrastructure can be omitted. The monitoring device preferably has other wireless and/or wired communication means for communicating with the activity zones and/or the user and/or further information systems.

The monitoring device preferably has an Internet-based interface for communicating with the at least one gardening tool and/or at least one user and/or at least one external information system. The gardening tools preferably have Internet-based interfaces. Alternatively, the gardening tools may be connected via a local data connection with a communication tool, which communicates with the monitoring device via an Internet-based interface. In this context, an "Internet-based interface" should be understood in particular as a preferably TCP/IP-based data connection with the Internet. The monitoring device may preferably communicate via the Internet and/or be accessed via the Internet and/or receive information from the Internet and/or make information available on the Internet. The monitoring device may use a particularly large number of information services, such as map servers, meteorological services, calendar services, email services, storage services and/or social networks. The monitoring device can advantageously use this information for controlling and/or monitoring activities of the gardening tools and/or for scheduling activities. The monitoring device can particularly easily provide information to a user worldwide and/or receive information from a user, for example on a computer and in particular a tablet, a smartwatch, a smartglass and/or a smartphone. The user may also carry a chip and/or tag which transmits information to the monitoring device. In particular, the chip and/or tag may be used to identify and/or transmit the location of the user.

The monitoring device advantageously has at least one locating means for detecting a position and/or orientation of the at least one gardening tool within at least one activity zone. The locating means may be a part of the gardening tool and transmit the position and/or orientation information to the monitoring device. The monitoring device can advantageously control and monitor the activities of the gardening tools depending on their position and/or orientation. For example, the monitoring unit may set an irrigation pattern of an irrigation tool such that a provided region of an activity zone is irrigated depending on the current position and/or orientation of the irrigation tool within the activity zone. The locating means may advantageously work independently of markings and/or special locating aids fixed in the activity zones. In particular, the locating aids can determine a location and/or position with the aid of radio-based navigation, in particular by evaluating GPS, WLAN, mobile and other radio signals. The gardening tools can be used particularly flexibly.

It is further proposed that, when at least one gardening tool is located outside an allowed zone and/or within a theft zone, the monitoring device is provided to deactivate the gardening tool and/or issue a notification. In this context, an "allowed zone" should be understood in particular as a zone within the garden in which the gardening tool may remain. In this context, a "theft zone" should be understood in particular as a zone in which the gardening tool can be brought in particular by theft. The theft zone may in particular be the zone outside of the garden. The allowed zone may in particular comprise the activity zones in which the gardening tool is to perform activities. The theft zone and/or the allowed zone may also be defined in another sensible-seeming manner. In this context, it should in particular be understood by "deactivate" that the gardening tool adjusts the activities essential to its application for which it is provided. In particular, the gardening tool may adjust irrigation, fertilization and/or cutting activities. In this context, a "notification" should be understood in particular as information to the user, in particular via an Internet-based communication tool, such as preferably a smartphone. The gardening tool may be unusable for a thief.

Particularly advantageously, the monitoring device may be provided to follow a position of the gardening tool outside the allowed zone and/or within the theft zone. In particular, the gardening tool may continue to send location and movement information to the monitoring unit in the deactivated state. The monitoring device can report the current location of the gardening tool to the user. The user can locate the gardening tool which has been stolen and/or removed from the allowed zone.

Further, a system with a monitoring device with at least one gardening tool is proposed. The monitoring device may be particularly well-adapted to the gardening tool.

Further, a monitoring device for a system for monitoring and controlling activities of at least one gardening tool within at least one activity zone is proposed. The monitoring device can advantageously control and monitor the at least one gardening tool.

Further, a method for controlling gardening tools with a monitoring device is proposed. The method may be adapted to control gardening tools very efficiently and with little conflict.

Further, a method with a monitoring device for creating activity zone map information is provided. The monitoring device may advantageously create the activity zone map information and/or activity zone maps from maps which are linked with further information.

The system according to the invention is not intended to be limited to the application and embodiment described above. In particular, for the fulfillment of one of the functions described herein, the system according to the invention may have a number of individual elements, components and units deviating from the number described herein.

DRAWINGS

Further advantages arise from the following description of drawings. An exemplary embodiment of the invention is shown in the drawings. The drawings, description and claims contain numerous features in combination. A person skilled in the art will expediently also consider the features individually and combine them into appropriate further combinations.

Figure 2:
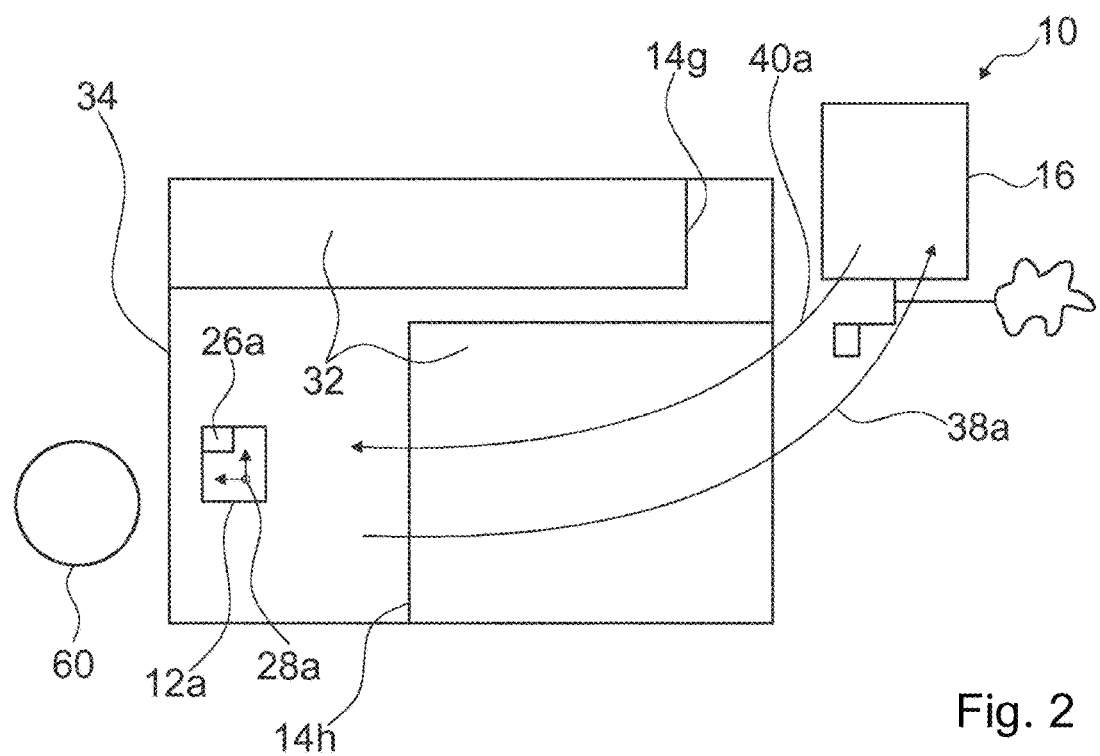
Figure 3:
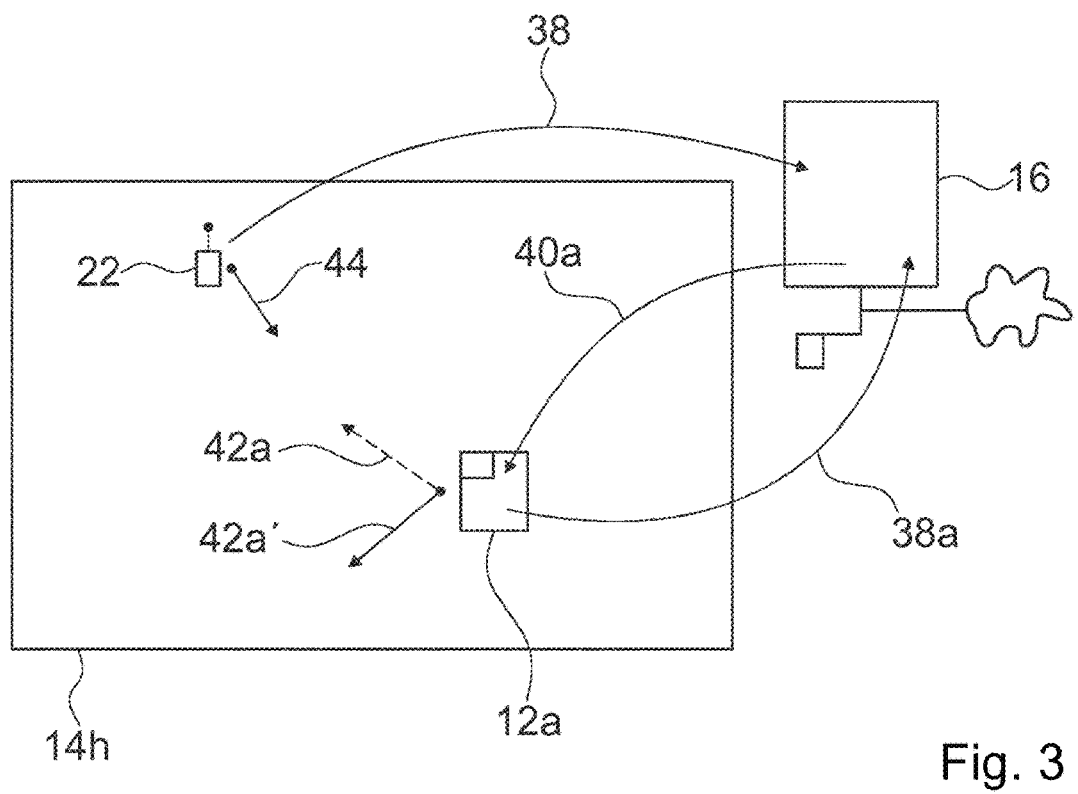
Figure 4:
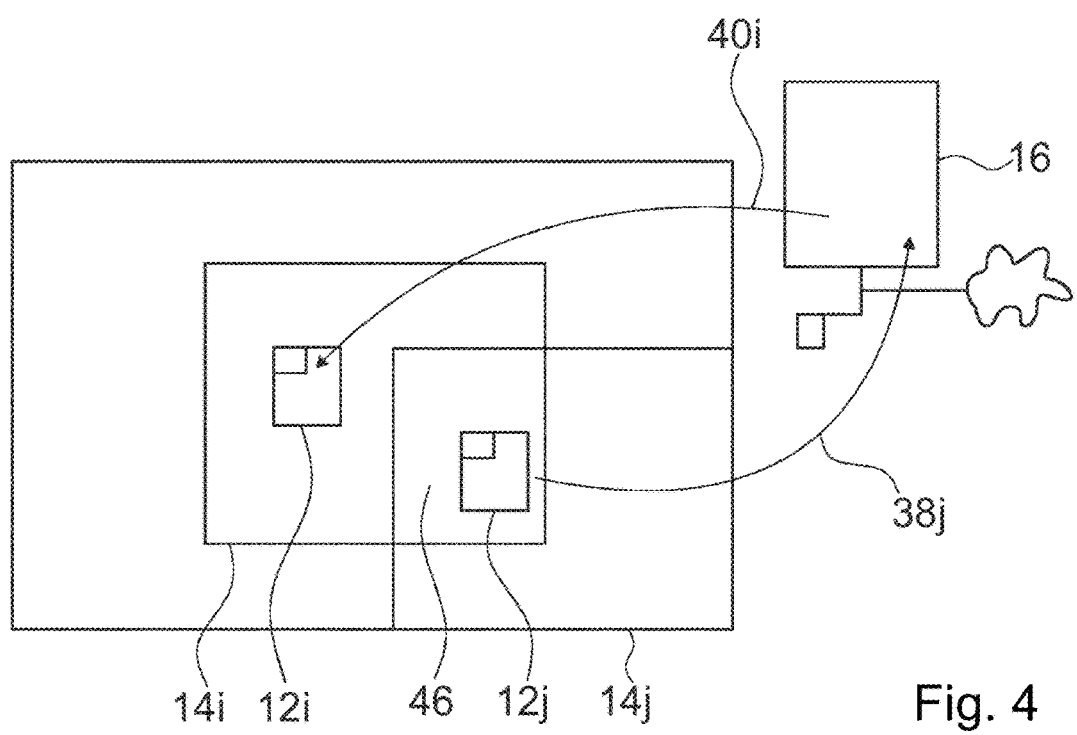
Figure 5:
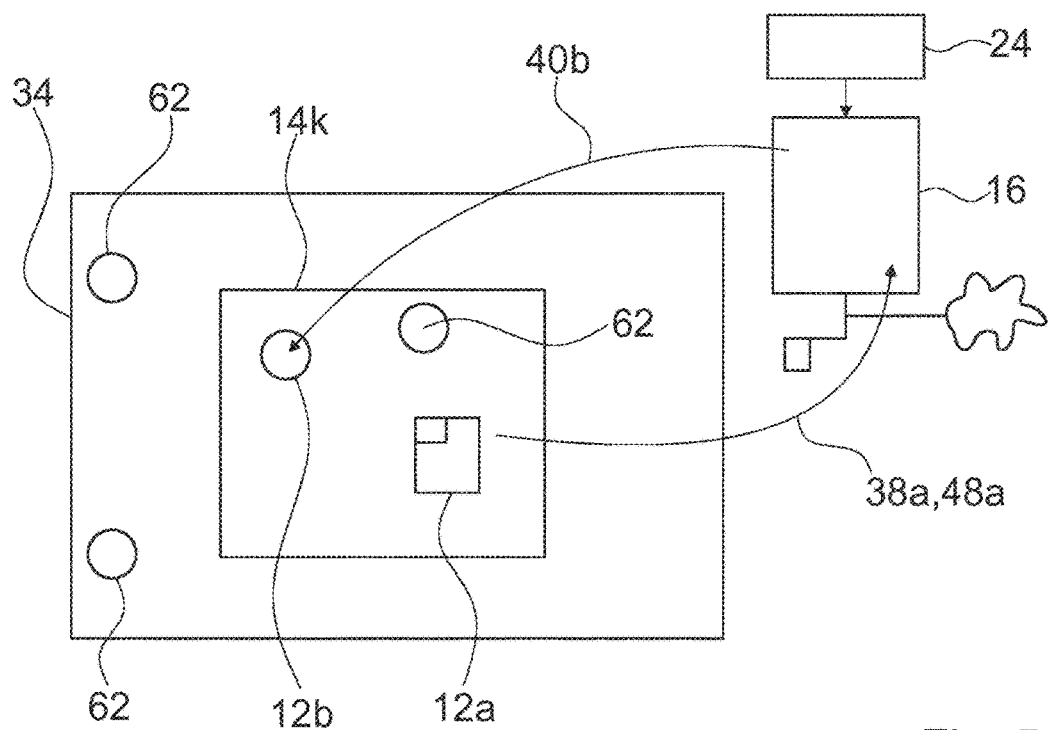
Figure 6:
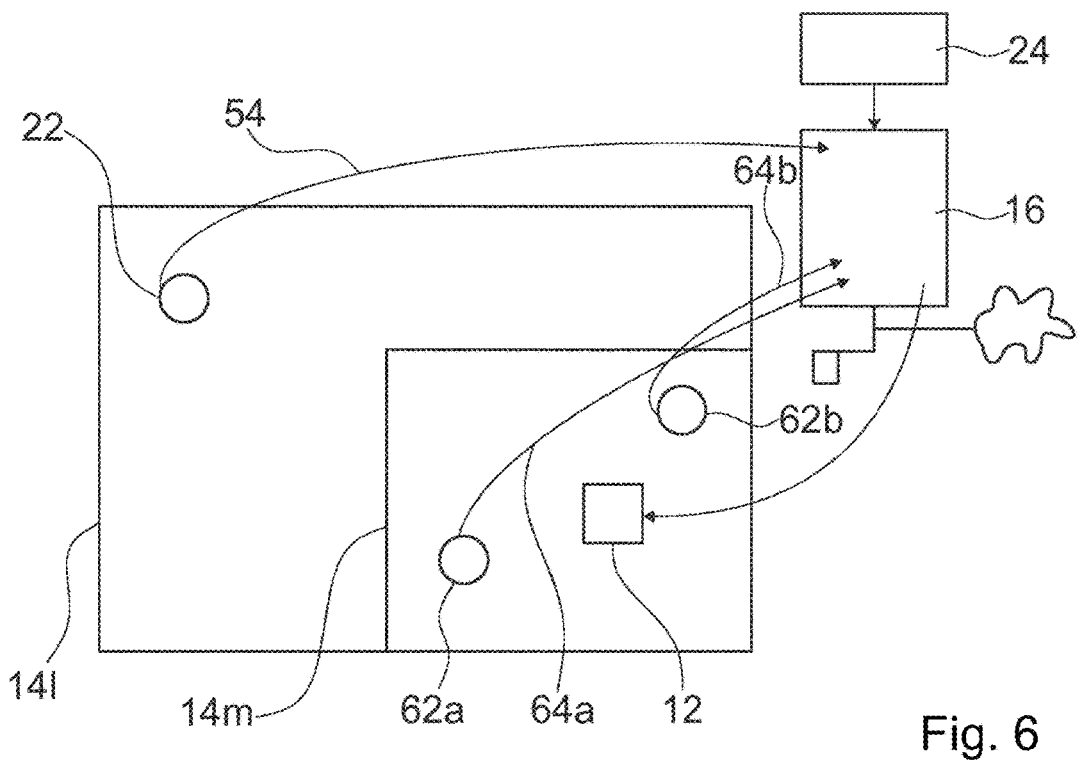
Figure 7:
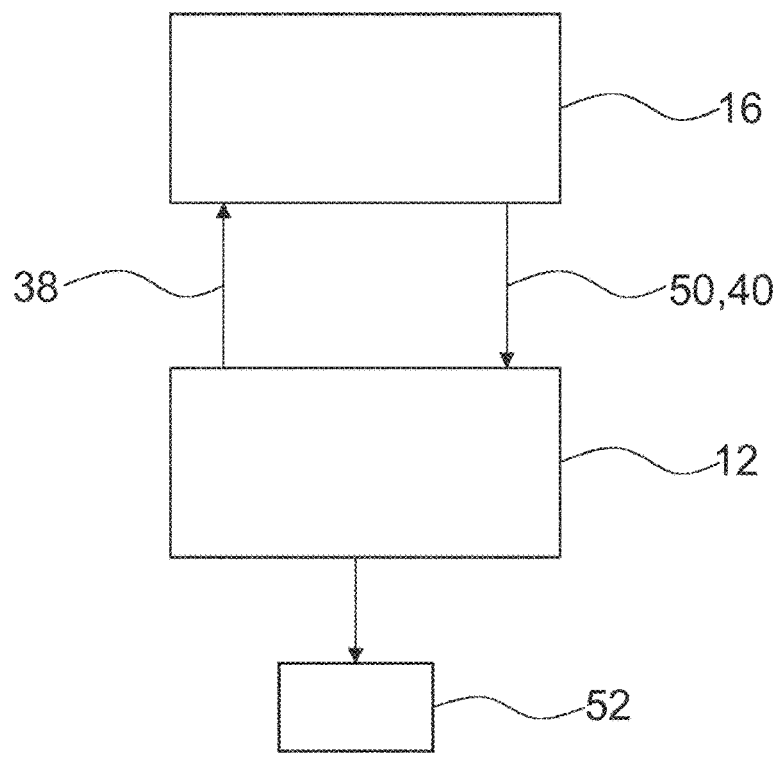
Figure 8:
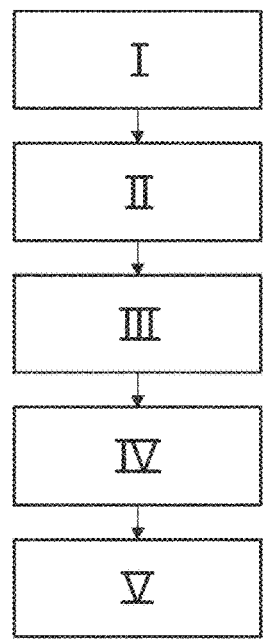
Figure 9:
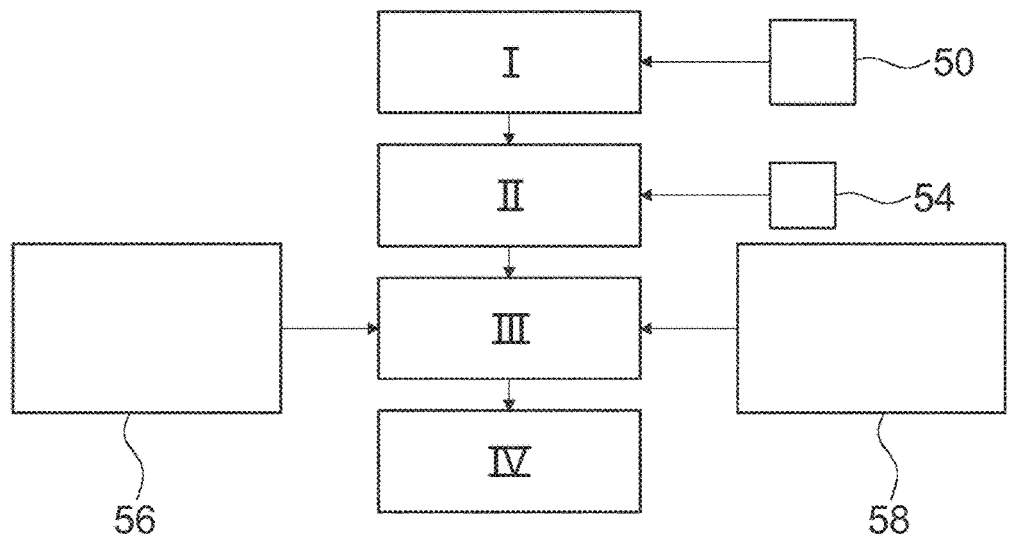
Figure 10:
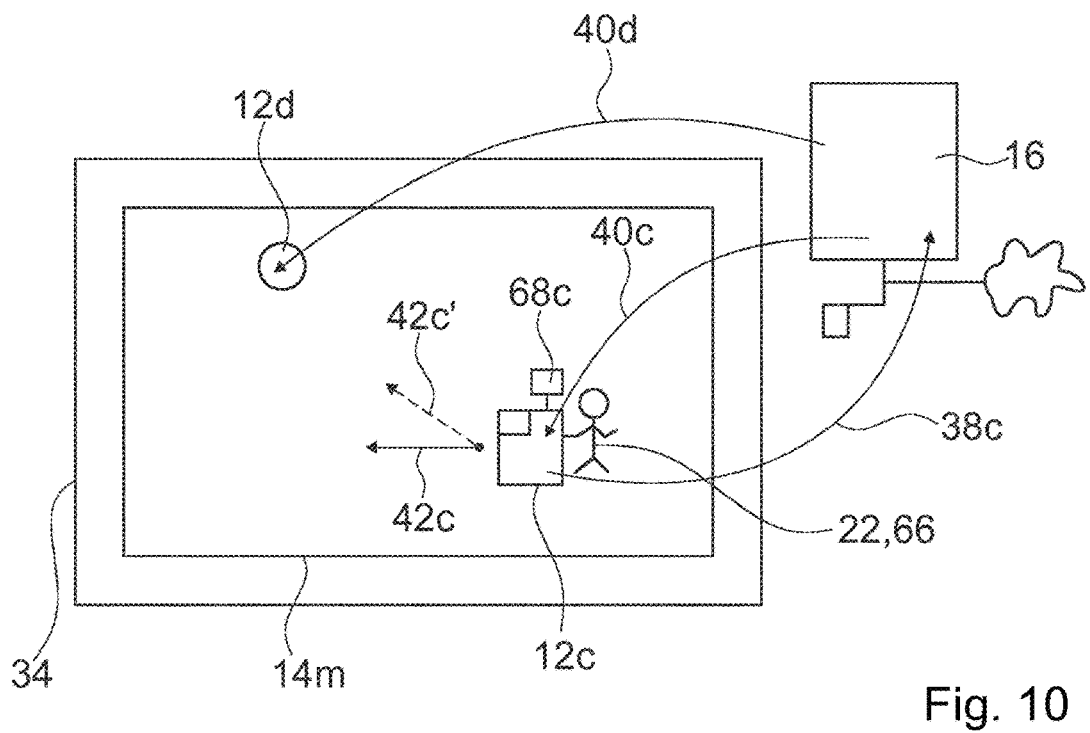

FIG. 1 shows a schematic representation of a system for monitoring and controlling activities of gardening tools within activity zones by means of a monitoring device, FIG. 2 shows a schematic representation of the system in a case of use in which a gardening tool leaves the activity zone, FIG. 3 shows a schematic representation of the system in a case of use in which a user is moving in an activity zone, FIG. 4 shows a schematic representation of the system in a case of use with overlapping activity zones, FIG. 5 shows a schematic representation of the system in a case of use with gardening tools of varying types, FIG. 6 shows a schematic representation of the system in a case of use with wireless sensors arranged in the activity zones, FIG. 7 shows a schematic representation of a flow of information between the monitoring device and the gardening tool, FIG. 8 shows a schematic representation of a method for determining activity zone map information, FIG. 9 shows a schematic representation of a method for the establishment of activities and FIG. 10 shows a schematic representation of the system in a case of use with a gardening tool guided by an operator.

DESCRIPTION OF THE EXEMPLARY EMBODIMENT

In the following exemplary embodiment, the invention and variants of its application are described. To distinguish between variants of individual elements, the reference characters thereof are adjusted with letters.

FIG. 1 shows a schematic representation of a system 10 for monitoring and controlling activities of gardening tools 12 within activity zones 14a, 14b, 14c, 14d, 14e, 14f of a garden 34 with a monitoring device 16. The monitoring device 16 is provided to evaluate the activity zone states of the activity zones 14a, 14b, 14c, 14d, 14e, 14f for controlling gardening tools 12, in this application the gardening tool 12a. Further, the monitoring device 16 has an interface 16 to a building automation system, not shown in detail here. The building automation system may coordinate a controlling and regulating of the building technology of a building in the region of the garden 34 with the activities of the gardening tools 12. The activity zone 14a is formed as a mowing zone 1, which is interrupted by the activity zone 14f, formed as a crossing zone. The activity zone 14b is formed as a fertilization zone. The activity zone 14c is formed as a mowing zone 2, which has a different cutting height with respect to the mowing zone 1. The activity zone 14d is formed as a hedge cutting zone. The activity zone 14e is formed as a prohibited zone, in which gardening tools 12 may not remain and in which gardening tools 12 may not perform activities. A prohibited zone may, for example, be a terrace which is used by users and which does not contain objects to be maintained by the activities of gardening tools 12. The gardening tool 12a is designed as a robotic mower, which cuts the lawn of the activity zones 14a and 14c as its primary activity, and for this purpose crosses the activity zone 14f. A further activity of the gardening tool 12 a may be, for example, searching for a charging station, not shown here, fr charging a battery unit of the gardening tool 12a. Further gardening tools 12 not shown in more detail here may be, for example, a fertilizing machine for fertilizing the activity zone 14b, a robotic hedge cutter for cutting hedges of the activity zone 14d or an irrigation tool for irrigating one or more of the activity zones 14.

The monitoring device 16 is formed as a server, which is provided for storing and processing data and which has an Internet-based interface 20 for communicating with gardening tools 12, users 22 and external information systems 24. The server may be located in a location independent of the garden 34 and communicate via the Internet-based interface 20. A wireless communication means 18, formed as a WLAN and/or cellular router 36, of the monitoring device 16 is arranged within or near the garden 34, so that a range of the WLAN and/or cellular router 36 is sufficient to communicate with the gardening tools 12 and to obtain information on the activity zones 14, in particular from sensors and monitoring apparatuses, not shown in further detail here, of the activity zones 14. In the case described, the gardening tool 12*a*, formed as a robotic mower, transmits the state information 38*a* of the gardening tool 12*a* to the monitoring device 16, in this case in particular its location and motion information, comprising a position 28*a* and an orientation 30*a* of the gardening tool 12*a*, and the monitoring device 16 sends a control signal 40*a* to the gardening tool 12*a*. The control signal 40*a* may, for example, contain an instruction to the gardening tool 12*a* to begin an activity, for example to mow the activity zone 14*a*. The gardening tool 12*a* may perform this activity autonomously, wherein the monitoring device 16 continuously monitors or retrieves as needed state information comprising the gardening tool state including current location and motion information of the gardening tool 12*a*. It is also possible that the monitoring device 16 directly controls the gardening tool 12*a*, in order to avoid conflicts and/or collisions with other gardening tools 12 or users 22. Here, the monitoring device controls the activities of the gardening tool 12 according to defined priorities. Cutting machines, for example the gardening tool formed as a robotic mower 12*a*, are prioritized relative to irrigation tools. It is thus ensured that cutting occurs before irritation. A locating means 26*a* formed as a GPS receiver generates the location and motion information as a part of the state information 38*a* and is a part of the monitoring device 16. The gardening tool 12*a* also has further locating means, not shown, such as distance sensors, to assist navigation in the activity zones 14.

FIG. 2 shows a further application example of the system 10 for monitoring and controlling activities of gardening tools 12. In this case, two activity zones 14*g*, 14*h* are arranged in the garden 34. The activity zones 14*g*, 14*h* form an allowed zone 32, in which the gardening tool 12*a* is operated. The gardening tool 12*a* sends location and motion information detected with the locating means 26*a* to the monitoring device 16 as a part of the state information 38*a*. If the gardening tool 12*a* is removed from the zone 32, the monitoring device 16 sends a notification via the Internet, which is received by the user 22, for example by means of a smartphone or tablet computer. Alternatively, the user 22 may receive the notification with a smartwatch or a smartglass or a similarly suitable device. In addition, the monitoring device 16 issues a control signal 40*a* to the gardening tool 12*a* which deactivates the gardening tool 12*a*. Thus, the gardening tool 12*a* cannot perform activities outside the allowed zone 32, so that theft is uninteresting. After a user identification via the monitoring device 16, the user 22 may alter the allowed zone 32 in which the gardening tool 12*a* performs activities. In an alternative mode of operation of the system 10, a theft zone 60 is defined. The theft zone 60 may, for example, be the zone outside the garden 34 or outside the allowed zone 32, or may be defined by the user in another manner appearing sensible to him or her. The monitoring device 16 deactivates the gardening tool 12*a* if it is present in the theft zone 60. In deactivated mode outside the allowed zone 32 or in the theft zone 60, the gardening tool 12*a* continues to send its state information 38*a* with location and motion information to the monitoring device 16*a*. The monitoring device 16*a* tracks the current position 28*a* of the gardening tool 12*a* in deactivated mode, so that the user can localize the gardening tool 12*a* in the theft zone 60 and/or outside the allowed zone 32.

FIG. 3 shows a further application example of the system 10 for monitoring and controlling activities of gardening tools 12. The gardening tool 12*a* performs an activity in an activity zone 14*h* and moves in a direction of movement 42*a*. The gardening tool 12*a* transmits its state information 38*a* to the monitoring device 16. The user 22 continues to remain in the activity zone 14*h*. With the aid of a mobile telephone or a wristwatch with a data connection, the user determines and transmits his or her state information 38, comprising location and motion information, to the monitoring device 16. The monitoring device 16 recognizes that the direction of motion 42*a* of the gardening tool 12*a* and the direction of motion 44 of the user 22 would lead to a collision with or a dangerous proximity of the gardening tool 12*a* to the user 22. The monitoring device 16 sends a control signal 40*a* to the gardening tool 12*a*, in order to change the direction of motion 42*a* of the gardening tool 12*a* to a new direction of motion 42*a'* and avoid a collision. Alternatively, a pet that has a GPS collar or similar apparatus may also be a user. The monitoring device 16 can detect the whereabouts of the pet and control the gardening tool 12*a* such that a collision or a dangerous proximity to the pet does not occur. Likewise, multiple users present in the activity zone 12*g* may be detected by the monitoring device 16, for example multiple pets and people.

FIG. 4 shows a further application example of the system 10 for monitoring and controlling activities of gardening tools 12. In this case, the two activity zones 14*i*, 14*j* overlapping in an overlapping region 46 are arranged in the garden 34. One gardening tool 12*i* is provided for mowing the activity zone 14*i*, and one gardening tool 12*j* is provided for mowing the activity zone 14*j*. The gardening tool 12*j* sends its state information 38*j* to the monitoring device 16. The monitoring device 16 detects that the gardening tool 12*j* has already mowed the overlapping region 46 of the two activity zones 14*i*, 14*j*. The monitoring device 16 sends a control signal 40*i* to the gardening tool 12*i*, that the gardening tool 12*i* should omit the overlapping region 26 when mowing. A double-mowing of the overlapping region 46 or a collision of the two gardening tools 12*i*, 12*j* in the overlapping region 46 is avoided.

FIG. 5 shows a further application example of the system 10 for monitoring and controlling activities of gardening tools 12. In this case, one activity zone 14*k* is arranged in the garden 34. The gardening tool 12*a* formed as a robotic mower and a gardening tool 12*b* formed as a lawn sprinkler are located in the activity zone 14*k*. The gardening tool 12*a* sends its state information 38*a* to the monitoring device 16 as well as moisture information 48*a* of the soil at the location at which the gardening tool 12*a* is present. From an external information system 24, the monitoring device 16 receives the current weather report with information on expected temperatures, sunshine and precipitation. The monitoring device 16 combines this data and, as needed, sends the gardening tool 12*b* a control signal 40*b* to irrigate the activity zone 14*k*. Because the mowing of wet grass is disadvantageous, the monitoring device 16 sends the gardening tool 12*b* the control signal 40*b* for irrigation only after the gardening tool 12*a* has finished mowing the activity zone 14*k*. Further, the monitoring device 16 may take calendar information into account, for example if the user 22 has left a period of time in the calendar in which he or she will be present in the activity zone 14*k* and thus does not wish to irrigate. Wireless sensors 62 are further arranged in the garden 34 and in the activity zone 14*k*. The wireless sensors 62 are provided to determine environmental conditions in the garden 34 and in the activity zone 14*k*, such as soil moisture and temperature, light, wind, humidity and temperature conditions, pH level, fertilizer concentration and rainfall. The wireless sensors 62 transmit these environmental conditions to the monitoring device 16, which updates the activity zone state of the activity zone 14k based on the transmitted environmental conditions.

FIG. 6 shows a further application example of the system 10 for monitoring and controlling activities of gardening tools 12, one of which is shown by way of example in FIG. 6. A user 22 is present in an activity zone 14l. The gardening tool 12 is present in an activity zone 14m in which two wireless sensors 62a, 62b are arranged. The wireless sensors 62a, 62b are provided to determine environmental conditions such as soil moisture and temperature, light, wind, humidity and temperature conditions, pH level, fertilizer concentration and rainfall. The wireless sensors 62a, 62b transmit the environmental conditions to the monitoring device 16 in the form of environment information 64a, 64b. The monitoring device 16 receives additional information from the external information system 24, in particular the current weather report with information on the expected temperatures, sunshine and precipitation. With this information, the monitoring device 16 updates the activity zone states of the activity zones 14l, 14m. The user 12 transmits user inputs 54 to the monitoring device 16, in particular shortcomings in the activity zones 14l, 14m observed by the user, such as an insufficiently cut lawn, under- or over-irrigated zones, plants with signs of deficiency or pest infestation. The monitoring device 16 uses the environmental conditions, environment information 64a, 64b, user inputs 54 and information from the information system 24 for updating the activity zone states and for controlling the activities of gardening tools 12. In particular, the monitoring device optimizes the irrigation of the activity zones 14l, 14m, a mixture of fertilizers and/or pesticides and/or the mowing of grass based on this information. If the user 22 finds that an activity zone 14l, 14m is over-irrigated, the monitoring system 16 interrupts a planned irrigation. By means of the user input 54, the user 22 may additionally control gardening tools 12 directly, and directly start or stop activities of the gardening tools 12. The user 22 can thus actively engage in the controlling of the gardening tools 12 via the monitoring device 16 and initiate or stop activities of the gardening tools 12. For the user input 54, the user 22 may advantageously use a mobile phone or a wristwatch with a data connection.

FIG. 7 shows a flow of information between the monitoring device 16 and the gardening tool 12. The gardening tool 12 sends its state information 38 to the monitoring device 16. The monitoring device 16 sends activity zone map information 50 to the gardening tool 12, which activity zone map information 50 contains a map of an activity zone in which the gardening tool 12 is present. The gardening tool 12 can thus autonomously perform activities in the activity zone. Further, the monitoring device 16 sends a control signal 40 in order to give the gardening tool 12 an instruction with an activity 52 to begin.

FIG. 8 shows a method for determining activity zone map information 50 of an activity zone. In step I, a location in the garden 34 is determined, for example, by a user input or GPS locating. In step II, a zone map of the garden 34 is loaded via an interface 20 from an information system 24 formed as a map server. In step III, the activity zones are registered on the zone map of the garden 34. In step IV, the activity zones are improved by a more exact description, in particular the nature of the activity area, which activities are to be performed in this activity zone by which gardening tools 12, as well as particular rules and precautions for the activity zone. Step IV may be carried out autonomously by the monitoring device 16, for example by the evaluation of aerial photographs on which different types of vegetation are visible. Step IV may also be supported by the user 22, who undertakes further inputs, in particular while he or she records additional information in the garden 34 with a smartphone or tablet computer or another suitable portable tool. In step V, the activity zone map information 50 of the activity zone is created by linking the data. In addition, the activity zone map information 50 is supplemented through the monitoring device 16 with state information 38 detected by the gardening tools 12.

The gardening tool 12a, designed as a robotic mower, has, for example, distance sensors and sensors to detect grass height. This data is transmitted to the monitoring device 16 with the state information 38 in addition to the location and motion information. With this data, the monitoring device 16 may detect and/or revise modifications to the boundaries of the activity zones 14a and 14c formed as a lawn. Changes in the garden 34 can thus be recognized by the monitoring device and tracked in the activity zone map information 50.

FIG. 9 shows a representation of a method for determining the activities 52 by the monitoring device 16. In step I, activity zone map information 50 of at least one activity zone 14 is read. In step II, a user input 54 is read, for example a calendar interval for which the activities 52 are to be generated. In step III, an activity zone state of the activity zone 14 is updated. To this end, activity zone information 56 is read via a sensor mounted in an activity zone 14 or via a gardening tool 12 which is located in the activity zone 14. The activity zone information 56 may comprise a fertilizer concentration, soil density, vegetation type, moisture and other factors. Further, an environmental condition 58 is read. The environmental condition 58 may be determined via external information systems 24 or sensors and may comprise a weather forecast, a density of persons in the activity zone 14, animals and moving and stationary objects in the activity zone 14. In step IV, after linking the information, activities 52 of the gardening tools 12 are advantageously triggered. It is also possible that steps I to IV are executed in another suitable sequence deviating from this example.

FIG. 10 shows a further application example of the system 10 for monitoring and controlling activities of gardening tools 12. One activity zone 14m is arranged in the garden 34. A gardening tool 12c is formed as an operator-guided lawn mower. In this case, the user 22 is an operator 66 of the gardening tool 12c. The monitoring device 16 sends a control signal 40c to the gardening tool 12c, which control signal 40c contains a setting for a cutting height and a proposed direction of movement 42c for rowing the activity zone 14m. The gardening tool 12c sets the cutting height autonomously and, with the aid of a display unit 68c, displays the proposed direction of movement 42c to the operator 66. The operator 66 guides the gardening tool 12c, whereby he or she may deviate from the proposed direction of movement 42c. The gardening tool 12c sends its state information 38c, which comprises location and motion information, to the monitoring device 16. The monitoring device 16c thus recognizes the movements actually performed by the gardening tool 12c, and dynamically adjusts the direction of movement 42c proposed to the operator 66. The proposed direction of movement 42c is selected by the monitoring device 16 such that the activity zone 14m is mowed as efficiently as possible. Further, the monitoring device 16 adjusts the direction of movement 42 and/or the directions of movement of further gardening tools, not shown here, in the activity zone 14m such that impermissible proximities between the further gardening tools and the gardening tool 12c with the operator 66 are avoided. If the operator 66 deviates from the proposed direction of movement 42c, the monitoring device 16c adjusts the directions of movement 42 and/or activities of the further gardening tools such that conflicts are avoided. A further gardening tool 12d is located in the activity zone 14m, which is formed as a lawn sprinkler. The monitoring device 16 sends control signals 40d to the gardening tool 12d to activate or deactivate an irritation. The irrigation activities of the gardening tool 12d are adjusted by the monitoring device 16 such that irrigation in regions of the activity zone 14m in which the operator 66 is present is avoided.

REFERENCE CHARACTERS

10 System
12 Gardening tool
14 Activity zone
16 Monitoring device
18 Communication means
20 Interface
22 User
24 Information system
26 Locating means
28 Position
30 Orientation
32 Zone (allowed zone)
34 Garden
36 WLAN and/or cellular router
38 State information
40 Control signal
42 Direction of movement
44 Direction of movement (user)
46 Overlapping region
48 Moisture information
50 Activity zone map information
52 Activity
54 User input
56 Activity zone information
58 Environmental condition
60 Theft zone
62 Wireless sensor
64 Environment information
66 Operator
68 Display unit

The invention claimed is:

1. A system for monitoring and controlling activities of gardening tools within activity zones, the system comprising a monitoring device configured to evaluate at least one activity zone state of each of the activity zones and at least one gardening tool state of each of the gardening tools for controlling the gardening tools, wherein the monitoring device is configured to simultaneously monitor and control at least two of the activity zones in parallel.

2. The system of claim 1, wherein at least some of the activity zones overlap to define an overlapping region.

3. The system of claim 2, wherein the monitoring device is configured to determine when a first one of the gardening tools enters the overlapping region from a first activity zone and, responsive to determining that the first one of the gardening tools has entered the overlapping region, provide an instruction to a second one of the gardening tools in a second activity zone to omit the overlapping region from operations.

4. The system of claim 3, wherein the first and second ones of the gardening tools are each robotic mowers, and the instruction prevents a collision of the first and second ones of the gardening tools in the overlapping region.

5. The system of claim 3, wherein the first and second ones of the gardening tools are each different types of gardening tools.

6. The system of claim 5, wherein the monitoring device is configured to simultaneously monitor movement and operation of the first and second ones of the gardening tools.

7. The system of claim 1, wherein the monitoring device is configured to create activity zone map information of the activity zone by linking zone map information with user information or activity zone states or gardening tool states.

8. The system of claim 1, wherein the monitoring device is configured to link at least one user information with at least one activity zone state or at least one environmental condition.

9. The system of claim 1, wherein the monitoring device comprises a wireless communication means for communicating with the gardening tools.

10. The system of claim 1, wherein the monitoring device comprises an Internet-based interface for communicating with the gardening tools and at least one user and at least one external information system.

11. The system of claim 1, wherein the monitoring device has at least one locating means for detecting a position or orientation of each of the gardening tools.

12. The system of claim 11, wherein, when one of the gardening tools is located outside an allowed zone, the monitoring device is configured to deactivate the gardening tool or issue a notification.

13. The system of claim 12, wherein the monitoring device is configured to follow a position of the one of the gardening tools outside the allowed zone.

14. The system of claim 11, wherein, when one of the gardening tools is located within a theft zone, the monitoring device is configured to deactivate the gardening tool or issue a notification.

15. The system of claim 14, wherein the monitoring device is configured to follow a position of the one of the gardening tools within the theft zone.

16. The system of claim 1, wherein the system comprises one or more wireless sensors associated with each of the activity zones.

17. The system of claim 16, wherein the one or more wireless sensors provide environmental condition information, and wherein the monitoring device uses the environmental condition information to determine the at least one activity zone state.

* * * * *